Feb. 26, 1935. D. J. SANTORA 1,992,775
AUTOMATIC SIGNAL AND STOP LIGHT
Filed April 23, 1930 2 Sheets-Sheet 2
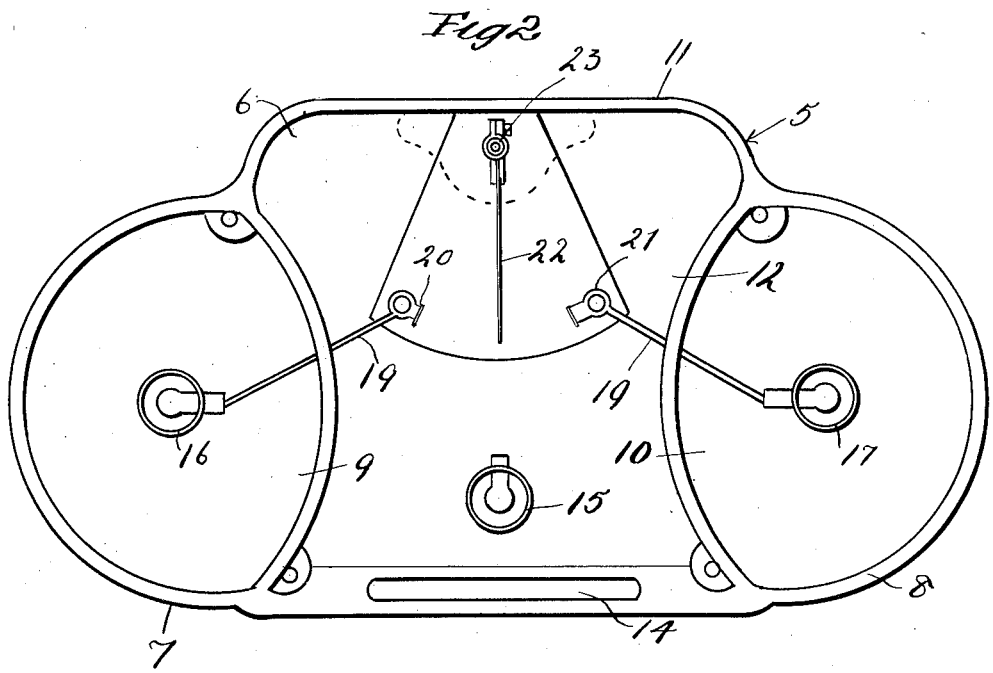
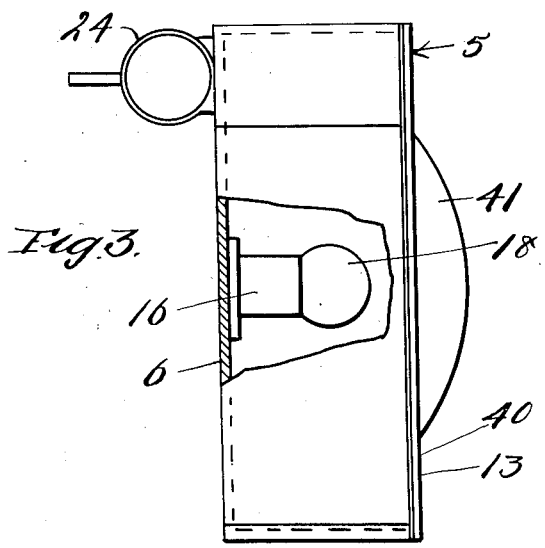
Inventor
Daniel J. Santora
By W. W. Williamson
Atty.

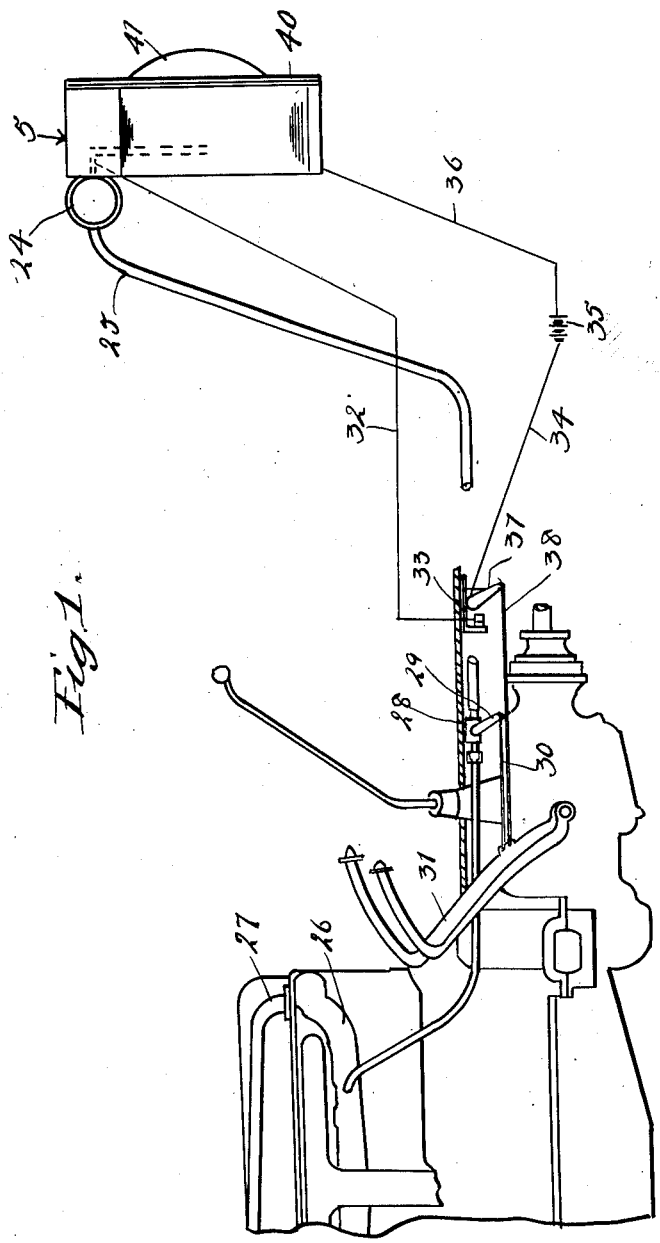

Patented Feb. 26, 1935

1,992,775

UNITED STATES PATENT OFFICE 1,992,775

AUTOMATIC SIGNAL AND STOP LIGHT

Daniel J. Santora, West Collingswood, N. J.

Application April 23, 1930, Serial No. 446,456

2 Claims. (Cl. 177—329)

My invention relates to new and useful improvements in an automatic signal and stop light for use in connection with automobiles or other vehicles, especially self-propelled ones carrying a source of electrical energy, and means for actuating an air or vacuum motor, such as is generally used in connection with wind shield wipers and has for one of its objects to provide an exceedingly simple and effective device of this character which may be readily applied to a vehicle or incorporated as a part thereof during the course of manufacture of the vehicle.

Another object of the invention is to provide a flashing signal having unique features and embodying novel details of construction.

A further object of the invention is to provide a flashing signal for vehicles for indicating to surrounding traffic or pedestrians that the operator of the vehicle equipped with such a signal is about to change his course or bring the vehicle to a stop.

A still further object of the invention is to provide a signal which will be plainly visible to surrounding traffic, especially traffic following the vehicle equipped with such a signal and which will be actuated in such a manner as to be sure to attract the attention of surrounding traffic and thereby reduce to a minimum the likelihood of accidents which often times result in property damage or actual loss of life.

Another object of the invention is to provide a signal of the kind mentioned embodying a plurality of lamps, preferably two in number and preferably electric lamps, each having an independent circuit, a swinging switch element for alternately completing the circuits through the two lamps and an air motor for actuating the switch element.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which—

Fig. 1 is a diagrammatical view of the invention in which is illustrated a part of an automobile engine, the gear shift and brake mechanism, the signal and component parts or connecting elements.

Fig. 2 is a face view of the base or supporting plate with the cover or casing removed.

Fig. 3 is a side elevation or end view with a portion of the signal casing broken away.

In carrying out my invention as herein embodied, 5 represents the signal proper which may consist of a base plate or supporting member 6 fashioned to provide locations for the signal lamps and other parts and as herein illustrated, said base plate or supporting member has outwardly projecting walls or flanges 7 and 8 to provide signal lamp compartments 9 and 10 and also an outstanding flange or wall 11 so as to partially enclose the compartment 12 between the lamp compartments, but there being no wall or flange at the bottom of the last mentioned compartment, the lower part of said compartment will be open even when the lid or closure or cover plate 13 is in place and therefore light rays from a rear indicating lamp may shine upon a license plate depending from the lower part of the base plate or supporting member.

For convenience of fastening the license plate on to the signal, a slot 14 may be provided for the reception of suitable fastening devices which pass through the license plate.

In the lower part of the compartment 12 is a socket 15 to hold an electric lamp or bulb (not shown) and this will always show a light when the lighting circuit is closed.

In the signal compartments 9 and 10 are located electric lamp sockets 16 and 17 respectively for the reception of electric lamps or bulbs, one of which is shown in Fig. 3 and indicated by the numeral 18. The electric lamp sockets 16 and 17 are connected by conductors 19 with contact members 20 and 21 carried by the base plate or supporting member and located within the compartment 12, preferably in the upper part thereof as shown in Fig. 2, the said contact members being separated but in the path of travel of an oscillating blade 22 which is of electrical conductive material and therefore acts as a switch element.

The blade 22 is mounted upon that end of the shaft 23 which projects through the base plate or supporting member and said shaft is carried by the reciprocating motor 24 preferably of the air or vacuum operated type and is similar to those used in connection with wind shield wipers but some other suitable form of motor may be utilized. One example of a motor such as referred to herein is shown in Patent #1,709,682, dated April 16, 1929. As herein illustrated, this motor is connected by means of a tube 25 or other suitable equivalent conduit with the intake manifold 26 of an engine 27, said engine being the source of power for running the vehicle. It will be readily understood that the tube or conduit 25 may be connected in some other way as for instance to the outlet of a carburetor or to a vacuum tank.

Wherever a suction device or means is hereinafter referred to, it is to include any device or means for causing a flow of air through the motor 24. In the pipe or conduit 25 is a valve 28 to control the passage of air through said conduit and the valve handle 29 has one end of a connecting rod 30 pivoted thereto while the other end of said connecting rod is pivoted to the brake lever 31 in such manner that when the brake lever is depressed or actuated for applying the brakes, the valve 28 will be more or less open according to the degree of movement of the brake lever and the opening of said valve will permit the suction device or means to draw air from the conduit 25 and thereby operate the motor 24 as is well known. The functioning of the motor 24 will rotate the shaft 23 and therefore oscillate the blade 22 causing it to alternately engage the contact members 20 and 21 thereby partially completing the circuit through the sockets 16 and 17 or the signal lights or bulbs 18 mounted in said sockets.

The reference numeral 32 denotes a conductor connecting one side of a switch 33 with the oscillating blade 22, as through the shaft 23 while the other side of said switch may be connected by a conductor 34 with one pole of a source of electric energy 35, such as a battery and the other pole of the battery is grounded on the frame of the vehicle as is the general practice and the signal device is electrically connected with the vehicle frame as is also usual, thus providing electrical communication between the signal lamp sockets or the signal lamps or bulbs therein and the other pole of the battery, such communication being illustrated as a conductor 36 in the diagrammatic view in Fig. 1.

The movable element of the switch 33 has a handle 37 to which is pivoted one end of a connecting rod or pitman 38 while the opposite end of said pitman or connecting rod 38 is pivotally connected with the brake lever 31 so that as the latter is moved in the direction for applying the brakes, the switch 33 will be closed to also partially provide a circuit through the signal lamps but it is to be understood that this circuit is only completed at such time as the switch 33 is closed and the oscillating blade 22 is in engagement with one of the contacts 20 or 21.

On the base plate or supporting member is mounted a lid or cover 40 so as to enclose the several compartments and this lid or cover carries the transparent means or lenses 41 through which the rays of light from the several lamps pass, it being understood that there is a lens provided with each signal lamp as well as the rear indicating lamp.

As soon as the brake lever is actuated or depressed for applying the brakes of the vehicle having the signal installed thereon, the switch 33 will be closed thereby partially completing the circuit or circuits through the signal lamps. Simultaneously with the closing of this part of the circuit, the valve 28 will be open and assuming that the suction means is operating or functioning, air will be caused to flow through the conduit 25 for operating the motor 24.

The operation of the motor will rotate the shaft 23 and therefore oscillate the blade 22 and cause it to alternately engage the contacts 20 and 21 thereby completing a circuit through one signal lamp and then the other so that said signal lamps will be intermittently lighted to produce a flashing effect which will immediately attract attention to persons in the vicinity thereof and will indicate to following traffic that the operator of the vehicle equipped with such signal is about to stop or change his direction of travel, thus cautioning the following traffic to be careful or on the alert.

Of course I do not wish to be limited to the exact details of construction as herein shown, as these may be varied within the limits of the appended claims without departing from the spirit of my invention.

Having thus fully described my invention, what I claim as new and useful is:—

1. In a device of the kind described, a housing having three separate compartments arranged side by side, a lamp socket in each of the outer compartments, two contact members in the central compartment and in spaced relation, means to connect one of said contact members with one of the lamp sockets, means to connect the other contact member with the other lamp socket, and an oscillating blade of electric conductive material for connection with a source of electrical energy and alternately engaging the contact members.

2. In a signal, a housing fashioned to provide three compartments in a row, a blade of electrical conductive material mounted in the central compartment and connected with a source of electrical energy, means to oscillate said blade, a pair of contacts also mounted in the central compartment in spaced relation and on opposite sides of the blade in the path of travel thereof for alternate engagement thereby, a lamp socket in each of the end compartments, electric lamps in said sockets, a conductor connected to one of the contacts and one of the sockets, and another conductor connected to the other contact and the other socket whereby a circuit will be completed through each lamp alternately when the blade engages the contacts of the respective lamps.

DANIEL J. SANTORA.